United States Patent
Okumura

(10) Patent No.: US 10,202,515 B2
(45) Date of Patent: Feb. 12, 2019

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventor: Yuki Okumura, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 182 days.

(21) Appl. No.: 15/078,423

(22) Filed: Mar. 23, 2016

(65) Prior Publication Data

US 2016/0280944 A1  Sep. 29, 2016

(30) Foreign Application Priority Data

Mar. 23, 2015  (JP) .................................. 2015-059346

(51) Int. Cl.
*B41J 2/21* (2006.01)
*C09D 11/322* (2014.01)
(Continued)

(52) U.S. Cl.
CPC ........... *C09D 11/322* (2013.01); *B41J 2/2107* (2013.01); *C09D 11/14* (2013.01); *C09D 11/38* (2013.01)

(58) Field of Classification Search
CPC . B41J 2/01; B41J 2/04595; B41J 2/211; B41J 2/1433; B41J 2/17; B41J 2/17593; B41J 2/2107; B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04588; B41J 2/04586; B41J 2/14274; C09D 11/36; C09D 11/40;
(Continued)

(56) References Cited

U.S. PATENT DOCUMENTS

| 5,609,671 A | 3/1997 | Nagasawa |
| 5,837,045 A | 11/1998 | Johnson et al. |

(Continued)

FOREIGN PATENT DOCUMENTS

| JP | H08-003498 A | 1/1996 |
| JP | 2000-513396 A | 10/2000 |

(Continued)

OTHER PUBLICATIONS

Apr. 24, 2018—(JP) Notice of Reasons for Rejection—App 2015-059346—Eng Tran.

*Primary Examiner* — Manish S Shah
(74) *Attorney, Agent, or Firm* — Banner & Witcoff, Ltd.

(57) ABSTRACT

A water-based ink for ink-jet recording includes: a pigment; water; polyoxypropylene methyl glucoside; and a compound represented by the formula (1):

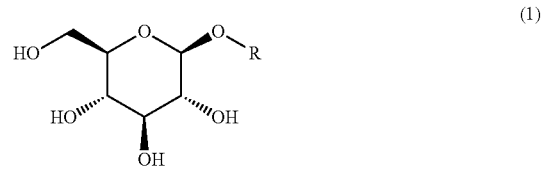

(1)

in the formula (1),
R is a straight or branched chain alkyl group having 2 to 10 carbon atoms.

15 Claims, 1 Drawing Sheet

(51) Int. Cl.
  *C09D 11/38* (2014.01)
  *C09D 11/14* (2006.01)
(58) Field of Classification Search
  CPC ....... C09D 11/30; C09D 11/38; C09D 11/322;
        C09D 11/328; C09D 11/101; C09D
        11/005; C09D 11/54; C09D 11/52; B41M
        5/0011; B41M 5/0017; B41M 7/00;
        B41M 7/0072; B41M 5/52; B41M 5/5218
  See application file for complete search history.

(56) References Cited

U.S. PATENT DOCUMENTS

| | | | |
|---|---|---|---|
| 7,819,962 | B2 | 10/2010 | Gu |
| 7,922,805 | B2 | 4/2011 | Kowalski et al. |
| 8,016,404 | B2 | 9/2011 | Kato et al. |
| 8,858,695 | B2 | 10/2014 | Gu et al. |
| 2002/0002931 | A1 | 1/2002 | Nakano et al. |
| 2005/0148685 | A1 | 7/2005 | Yamamoto |
| 2006/0201380 | A1 | 9/2006 | Kowalski et al. |
| 2007/0100023 | A1 | 5/2007 | Burns et al. |
| 2007/0100024 | A1 | 5/2007 | Gu et al. |
| 2008/0241398 | A1 | 10/2008 | Kato et al. |
| 2009/0229489 | A1 | 9/2009 | Gu |
| 2014/0292903 | A1* | 10/2014 | Maeda ................... C09D 11/38 347/20 |
| 2016/0075880 | A1 | 3/2016 | Gu et al. |

FOREIGN PATENT DOCUMENTS

| | | |
|---|---|---|
| JP | 2002-047438 A | 2/2002 |
| JP | 2004-231711 A | 8/2004 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2012-012592 A | 1/2012 |
| JP | 2012-233084 A | 11/2012 |
| JP | 2014-198750 A | 10/2014 |
| JP | 2014-198771 A | 10/2014 |

* cited by examiner

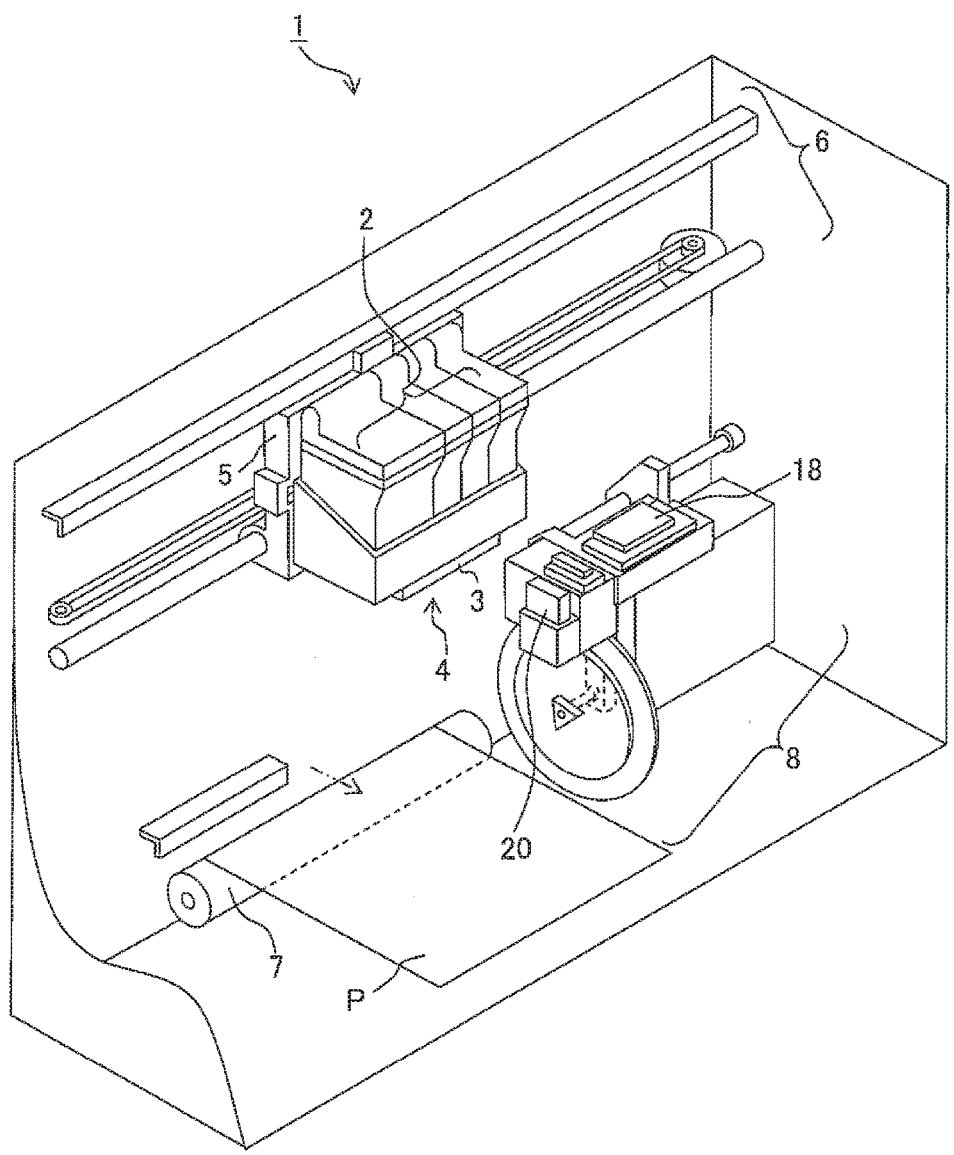

WATER-BASED INK FOR INK-JET RECORDING AND INK CARTRIDGE

CROSS REFERENCE TO RELATED APPLICATION

The present application claims priority from Japanese Patent Application No. 2015-059346 filed on Mar. 23, 2015, the disclosure of which is incorporated herein by reference in its entirety.

BACKGROUND OF THE INVENTION

Field of the Invention:
The present invention relates to a water-based ink for ink-jet recording and an ink cartridge.
Description of the Related Art:
Water-based pigment inks containing a pigment and water have been suggested as inks used for ink-jet recording (Japanese Patent Application laid-open No. 2004-231711).
In order to stably discharge the water-based pigment ink, the water-based pigment ink is required to prevent the increase in viscosity and the solidification due to drying which would cause the delay in ink discharge. In view of this, an object of the present teaching is to provide a water-based pigment ink for ink-jet recording preventing the increase in viscosity and the solidification due to drying which would otherwise cause the delay in ink discharge.

SUMMARY OF THE INVENTION

According to a first aspect of the present teaching, there is provided a water-based ink for ink-jet recording including: a pigment; water; polyoxypropylene methyl glucoside; and a compound represented by the formula (1):

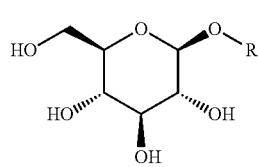

(1)

in the formula (1), R is a straight or branched chain alkyl group having 2 to 10 carbon atoms.
According to a second aspect of the present teaching, there is provided an ink cartridge which includes the water-based ink for ink-jet recording as defined in the first aspect.

BRIEF DESCRIPTION OF THE DRAWINGS

The FIGURE is a schematic perspective view of an exemplary construction of an ink-jet recording apparatus of the present teaching.

DESCRIPTION OF THE EMBODIMENTS

An explanation will be made about a water-based ink for ink-jet recording of the present teaching (hereinafter also referred to as "water-based ink" or "ink" in some cases). The water-based ink of the present teaching contains a pigment and water.
The pigment is not particularly limited and includes, for example, carbon black, inorganic pigment, and organic pigment. The carbon black includes, for example, furnace black, lamp black, acetylene black, and channel black. The inorganic pigment includes, for example, titanium oxide, iron oxide-based inorganic pigment, and carbon black-based inorganic pigment. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Other pigments are also usable provided that the pigments are dispersible in the water phase. The pigments are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violets 19, and 196; C. I. Pigment Blues 1, 2, 3, 15, 15:1, 15:2, 15:3, 15:4, 16, 22, and 60; C. I. Pigment Greens 7 and 36; and the like. The pigment may be solid solutions of the above-listed pigments. The water-based ink of the present teaching may be prepared by dispersing the pigment in water with a dispersant. As the dispersant, it is allowable to use, for example, any general polymeric dispersant. Alternatively, in the water-based ink of the present teaching, the pigment may be subjected to polymer capsulation.

The pigment may be a self-dispersible pigment. The self-dispersible pigment is dispersible in water without using any dispersant, for example, owing to the fact that at least one of the hydrophilic group and the salt thereof including, for example, carbonyl group, hydroxyl group, carboxylic acid group, sulfonic acid group (sulfonate group), and phosphoric acid group (phosphate group) is introduced into the surfaces of the pigment particles by the chemical bond directly or with any group intervening therebetween. For example, it is possible to use a self-dispersible pigment modified by carboxylic acid group which is modified by the carboxylic acid group and/or the salt thereof and a self-dispersible pigment modified by sulfonic acid group which is modified by the sulfonic acid group and/or the salt thereof. The self-dispersible pigment keeps its dispersion state due to the electrostatic repulsion of hydrophilic group modifying the pigment, and typically has no structure contributing to steric repulsion. Thus, pigment particles easily come closer to each other, and the increase in viscosity and the solidification due to drying are more likely to occur. The water-based pigment ink of the present teaching, however, prevents the increase in viscosity and the solidification due to drying, even though the self-dispersible pigment is used therein, and thus the water-based pigment ink of the present teaching is less likely to have the delay in ink discharge.

It is possible to use self-dispersible pigments subjected to the surface treatment by any one of methods described, for example, in Japanese Patent Application Laid-open No. HEI8-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/

0201380), Published Japanese Translation of PCT International Publication for Patent Application No. 2009-515007 (corresponding to United States Patent Application Publications No. US 2007/0100023 and No. US 2007/0100024), and Published Japanese Translation of PCT International Publication for Patent Application No. 2011-515535 (corresponding to United States Patent Application Publication No. US 2009/0229489). It is possible to use, as a material for the self-dispersible pigment, either one of the inorganic pigment and the organic pigment. Further, a pigment which is suitable for the above-described treatment includes, for example, carbon black such as "MA8" and "MA100" produced by Mitsubishi Chemical Corporation. As the self-dispersible pigment, it is possible to use, for example, a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The solid content blending amount of the pigment (pigment solid content amount) in the entire amount of the water-based ink is not particularly limited, and may be appropriately determined based on desired optical density, color (hue, tint), or the like. The pigment solid content amount is, for example, in a range of 0.1% by weight to 20% by weight, is preferably in a range of 3% by weight to 10% by weight, and is more preferably in a range of 7% by weight to 10% by weight. In general, the increase in viscosity and the solidification due to drying are more likely to occur, as the pigment solid content amount is greater. The water-based ink of the present teaching, however, prevents the increase in viscosity and the solidification due to drying, irrespective of the pigment solid content amount, and thus the delay in ink discharge is less likely to occur.

The water-based ink may or may not contain another colorant such as a dye, in addition to the pigment.

The water is preferably ion-exchanged water or pure water (purified water). The blending amount of the water in the entire amount of the water-based ink is, for example, in a range of 10% by weight to 90% by weight, preferably in a range of 40% by weight to 80% by weight, and more preferably in a range of 40% by weight to 61% by weight. The blending amount of the water in the water-based ink may be, for example, a balance of the other components.

As described above, the water-based ink further contains the polyoxypropylene methyl glucoside and the compound represented by the formula (1). The water-based pigment ink containing the polyoxypropylene methyl glucoside and the compound represented by the formula (1) prevents the increase in viscosity and the solidification due to drying which would otherwise cause the delay in ink discharge. Mechanisms achieving the above effect are assumed, for example, as follows. Namely, mixing the water-based pigment ink with bulky polyoxypropylene methyl glucoside prevents coagulation or aggregation of pigment. As a result, the increase in viscosity and the solidification due to drying are prevented and the delay in ink discharge is less likely to occur. The polyoxypropylene methyl glucoside has some degree of hydrophobic property, and thus it interacts with hydrophobic pigment to be present in the vicinity of the pigment. Meanwhile, the polyoxypropylene methyl glucoside has some degree of hydrophilic property, and thus it interacts with water in the water-based ink to retain water. Allowing bulky polyoxypropylene methyl glucoside retaining water to be present in the vicinity of the pigment prevents coagulation or aggregation of pigment. As described above, the polyoxypropylene methyl glucoside is a compound having the optimal balance between the hydrophobic property and the hydrophilic property which can prevent coagulation or aggregation of pigment. Further, although the polyoxypropyiene methyl glucoside has difficulty in dissolving in water, using the polyoxypropylene methyl glucoside in combination with the compound represented by the formula (1) allows the polyoxypropylene methyl glucoside to dissolve in water. Thus, no discharge failure due to insolubilization of the polyoxypropylene methyl glucoside occurs. The compound represented by the formula (1) is a compound in which sugar is glycoside-bonded to alcohol, and has a structure derived from sugar. The compound represented by the formula (1) which has the structure derived from sugar interacts with the polyoxypropylene methyl glucoside which is a monosaccharide, thereby facilitating the dissolution of polyoxypropylene methyl glucoside in water. The above mechanisms, however, are just assumptions and the present teaching is not limited to those.

The polyoxypropylene methyl glucoside is a monosaccharide to which propylene oxides are added. It is assumed that polypropylene oxide (PPO) contained in the polyoxypropylene methyl glucoside contributes to the optimal balance between the hydrophobic property and the hydrophilic property which can prevent coagulation or aggregation of pigment. Thus, for example, when polyoxyethylene methyl glucoside (a compound represented by the formula (3) which will be described later) having a similar structure is used instead of the polyoxypropylene methyl glucoside, the same effect as that obtained by the polyoxypropylene methyl glucoside can not be obtained. The reason thereof is assumed as follows. That is, the polyoxyethylene methyl glucoside having polyethylene oxide (PEO) has the hydrophilic property higher than that of the polyoxypropylene methyl glucoside, and the polyoxyethylene methyl glucoside has no optimal balance between the hydrophobic property and the hydrophilic property which can prevent coagulation or aggregation of pigment.

As the polyoxypropylene methyl glucoside, a compound represented by the formula (2) is preferably used. In the compound represented by the formula (2), the number of polypropylene oxide chains per one molecule is four.

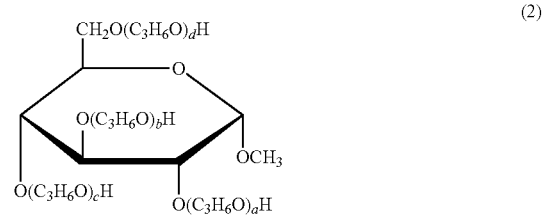

(2)

In the formula (2), a, b, c, and d satisfy $10 \leq a+b+c+d \leq 20$. "a+b+c+d" represents the additional molar number of propylene oxide per one molecule, which is an average value. a+b+c+d is preferably 10 or 20.

As the polyoxypropylene methyl glucoside, it is possible to use, for example, a commercially available product. The commercially available product includes, for example, "MACBIOBRIDE (trade name) MG-10P" and "MACBIOBRIDE (trade name) MG-20P" produced by NOF CORPORATION.

The blending amount of the polyoxypropylene methyl glucoside in the entire amount of the water-based ink (the proportion of polyoxypropylene methyl glucoside) is, for example, in a range of 1% by weight to 30% by weight, preferably in a range of 3% by weight to 22% by weight, more preferably in a range of 4% by weight to 20% by weight, and further preferably in a range of 6% by weight to 20% by weight. By making the proportion of polyoxypropylene methyl glucoside in the range of 4% by weight to 20% by weight, preferably in the range of 6% by weight to 20% by weight, the water-based ink better prevents the increase in viscosity and the solidification due to drying which would otherwise cause the delay in ink discharge.

In the formula (1), R is a straight or branched chain alkyl group having 2 to 10 carbon atoms. When R has carbon atoms exceeding 10, the effect of facilitating the dissolution of polyoxypropylene methyl glucoside in water is reduced. As the compound represented by the formula (1), it is possible to use, for example, a commercially available product. The commercially available product includes, for example, "SUCRAPH (trade name) AG-8" produced by Nippon Fine Chemical; "AG6206" and "AG6202" produced by Lion Corporation; "MYDOL (trade name) 10" produced by Kao Corporation; and the like.

The blending amount of the compound represented by the formula (1) in the entire amount of the water-based ink is, for example, in a range of 0.5% by weight to 20% by weight, preferably in a range of 0.8% by weight to 15% by weight, and more preferably in a range of 1% by weight to 8% by weight.

It is preferred that the water-based ink satisfy the following condition (1). The water-based ink satisfying the condition (I) better prevents the increase in viscosity and the solidification due to drying which would otherwise cause the delay in ink discharge. In the water-based ink satisfying the condition (I), the polyoxypropylene methyl glucoside has good solubility.

$A/B \leq 4$      condition (I)

A: a blending amount of the polyoxypropylene methyl glucoside in the water-based ink (% by weight)
B: a blending amount of the compound represented by the formula (I) in the water-based ink (% by weight)

It is more preferred that the water-based ink satisfy the following condition (II).

$2 \leq A/B \leq 4$      condition (II)

It is preferred that the water-based ink satisfy the following condition (III). The water-based ink satisfying the condition (I) better prevents the increase in viscosity and the solidification due to drying which would otherwise cause the delay in ink discharge.

$A/P = 0.4$ to $3.2$      condition (III)

A: a blending amount of the polyoxypropylene methyl glucoside in the water-based ink (% by weight)
P: a blending amount of the pigment in the water-based ink (% by weight)

It is preferred that the water-based ink satisfy the conditions (I) and (IV). The water-based ink satisfying the conditions (I) and (IV) better prevents the increase in viscosity and the solidification due to drying which would otherwise cause the delay in ink discharge.

$A/B \leq 4$      condition (I)

$A/P = 0.5$ to $2.9$      condition (IV)

The water-based ink may further contain a water-soluble organic solvent. The water-soluble organic solvent is exemplified, for example, by a humectant which prevents the water-based ink from drying at an end of a nozzle in an ink-jet head and a penetrant which adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above-described humectants, it is preferable to use polyvalent alcohols such as alkylene glycol and glycerol.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

When the water-based ink contains glycerol as the humectant, the blending amount of the glycerol in the entire amount of the water-based ink is, for example, in a range of 1% by weight to 50% by weight, preferably in a range of 4.0% by weight to 40% by weight, and more preferably in a range of 6.0% by weight to 36% by weight.

The penetrant includes, for example, glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One kind of the penetrant may be used singly, or two or more kinds of the penetrants may be used in combination.

The blending amount of the penetrant in the entire amount of the water-based ink is, for example, in a range of 0% by weight to 20% by weight, preferably in a range of 0% by weight to 15% by weight, more preferably in a range of 1% by weight to 4% by weight.

The water-based ink may further contain a conventionally known additive, as necessary. The additive includes, for example, surfactants, pH-adjusting agents, viscosity-adjusting agents, surface tension-adjusting agents, and fungicides. The viscosity-adjusting agents include, for example, polyvinyl alcohol, cellulose, and water-soluble resin.

The water-based ink can be prepared, for example, such that the pigment, water, the polyoxypropylene methyl glucoside, the compound represented by the formula (1), and optionally other additive component(s) are mixed uniformly or homogeneously by any conventionally known method, and undissolved matters are removed by a filter or the like.

The viscosity of the water-based ink is not particularly limited, and it is preferably in a range of 3 mPa·s to 5 mPa·s. The viscosity is a value measured, for example, at 25 degrees Celsius.

As described above, the water-based pigment ink containing the polyoxypropylene methyl glucoside and the compound represented by the formula (1) according to the present teaching prevents the increase in viscosity and the solidification due to drying which would otherwise cause the delay in ink discharge.

Next, the ink cartridge of the present teaching is characterized by being an ink cartridge containing a water-based ink for ink-jet recording; wherein the water-based ink for ink-jet recording is the water-based ink for ink-jet recording of the present teaching. For example, any conventionally known main body (body) of an ink cartridge can be used for the main body of the ink cartridge of the present teaching.

Next, an explanation will be given about an ink-jet recording apparatus and an ink-jet recording method of the present teaching.

The ink-jet recording apparatus of the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink.

The ink-jet recording method of the present teaching can be practiced, for example, by using the ink-jet recording apparatus of the present teaching. The recording includes printing a letter (text), printing an image, printing, etc.

The FIGURE depicts an exemplary configuration of the ink-jet recording apparatus of the present teaching. As depicted in the FIGURE, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. At least one water-based ink among the four color water-based inks is the water-based ink for ink-jet recording of the present teaching. The ink-jet head 3 disposed on the head unit 4 performs recording on a recording medium (for example, recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to U.S Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (see, for example, Japanese Patent Application laid-open No. 2008-246821 corresponding to U.S. Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In the FIGURE, a cap 18 is provided to cover a plurality of nozzles of the ink-jet head 3 which is returned to a reset position upon completion of the recording, so as to prevent the water-based inks from drying.

In the ink-jet recording apparatus 1 of this embodiment, the four ink cartridges 2 are provided, together with the head unit 4, on one carriage 5. However, the present teaching is not limited to this. In the ink-jet recording apparatus 1, the respective four cartridges 2 may be provided on a carriage which is different (separate) from the carriage on which the head unit 4 is provided. Alternatively, the respective four cartridges 2 may be arranged and fixed inside the ink-jet recording apparatus 1, rather than being provided on the carriage 5. In such aspects, for example, each of the four cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed from a feed cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The water-based ink of the present teaching prevents the increase in viscosity and the solidification due to drying which would otherwise cause the delay in ink discharge. The recording paper P after the recording is discharged from the ink-jet recording apparatus 1. In the FIGURE, illustration of the feed mechanism and discharge mechanism for the recording paper P is omitted.

In the apparatus depicted in the FIGURE, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and is not restricted to the examples and the comparative examples which will be described below.

Examples 1 to 20 and Comparative Examples 1 to 13

Components, except for a self-dispersible pigment, which were included in Water-based ink composition (TABLE 1) were mixed uniformly or homogeneously; and thus an ink solvent was obtained. Subsequently, the ink solvent was added to the self-dispersible pigment dispersed in water, followed by being mixed uniformly. After that, the obtained mixture was filtrated through a cellulose acetate membrane filter (pore size 3.00 µm) produced by Toyo Roshi Kaisha, Ltd., and thus the water-based ink for ink-jet recording of each of Examples 1 to 20 and Comparative Examples 1 to 13 was obtained.

Regarding the water-based inks of Examples 1 to 20 and Comparative Examples 1 to 13, (a) evaluation of delay in ink discharge and (b) evaluation of a vaporization property were performed by the following methods.

(a) Evaluation of Delay in Ink Discharge

An ink-jet printer "DCP-J525N" manufactured by BROTHER KOGYO KABUSHIKI KAISHA was used to record ruled lines on exclusive or dedicated paper ("BP60PA" produced by BROTHER KOGYO KABUSHIKI KAISHA), with a resolution of 600 dpi×300 dpi, by using the water-based inks of Examples 1 to 20 and Comparative Examples 1 to 13. Thus, evaluation samples were produced. Each of the evaluation samples was observed and the delay in ink discharge for each of the samples was evaluated based on the following evaluation criteria.

<Evaluation Criteria for Evaluation of Delay in Ink Discharge>

A: No delay in ink discharge was observed in an observation using a 50× microscope.

B: No delay in ink discharge was observed in a visual observation.

C: Delay in ink discharge was observed in the visual observation.

(b) Evaluation of Vaporization Property 5 g of the water-based ink of each of Examples 1 to 20 and Comparative Examples 1 to 13 was poured into an open bottle (vial) (diameter: 20.2 mm). Subsequently, the open bottle was stored overnight in a thermostatic chamber at a temperature of 60° C. After the storage, the state of the water-based ink in the open bottle was observed by a microscope of 200 magnifications, and the vaporization property was evaluated in accordance with the following evaluation criteria.

<Evaluation Criteria for Evaluation of Vaporization Property>

A: The water-based ink immediately flowed when the open bottle was inclined, and no aggregation and no separated material were observed.

B: The water-based ink flowed over time when the open bottle was inclined, and no aggregation and no separated material were observed.

C: The water-based ink did not flow when the open bottle was inclined, and an aggregation and separated material were observed.

TABLE 1 shows the water-based ink compositions and the evaluation results for the water-based inks of Examples 1 to 20 and Comparative Examples 1 to 13. Note that the formula (3) in TABLE 1 is as follows:

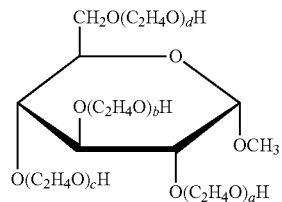

Table 1 (following)—Legend

1: Self-dispersible black pigment modified by carboxylic acid group; produced by Cabot Corporation; pigment solid content amount 15% by weight; parenthesized numerals indicate a pigment solid content amount 2: Self-dispersible black pigment modified by sulfonic acid group; produced by Cabot Corporation; pigment solid content amount 20% by weight; the parenthesized numeral indicates a pigment solid content amount 3: Self-dispersible magenta pigment; produced by Cabot Corporation; pigment solid content amount 10% by weight; the parenthesized numeral indicates a pigment solid content amount 4: a compound represented by the formula (2) (a+b+c+d=10); produced by NOF CORPORATION; active ingredient 100% by weight 5: a compound represented by the formula (2) (a+b+c+d=20); produced by NOF CORPORATION; active ingredient 100% by weight 6: a compound represented by the formula (3) (a+b+c+d=10); produced by NOF CORPORATION; active ingredient 100% by weight 7: a compound represented by the formula (3) (a+b+c+d=20); produced by NOF CORPORATION; active ingredient 100% by weight 8: a compound represented by the formula (1) in which R is an alkyl group having 8 carbon atoms; produced by Nippon Fine Chemical; active ingredient 50% by weight; Numerals in TABLE 1 indicate active ingredient amounts 9: a compound represented by the formula (1) in which R is an alkyl group having 6 carbon atoms; produced by Lion Corporation; active ingredient 65% by weight; Numerals in TABLE 1 indicate active ingredient amounts 10: a compound represented by the formula (1) in which R is an alkyl group having 2 carbon atoms; produced by Lion Corporation; active ingredient 75% by weight; Numerals in TABLE 1 indicate active ingredient amounts 11: a compound represented by the formula (1) in which R is an alkyl group having 10 carbon atoms; produced by Kao Corporation; active ingredient 40% by weight; Numerals in TABLE 1 indicate an active ingredient amount 12: a compound represented by the formula (1) in which R is an alkyl group having 15 carbon atoms; produced by DKS Co. Ltd.; active ingredient 50% by weight; the numeral in TABLE 1 indicates an active ingredient amount 13: a compound represented by the formula (1) in which R is an alkyl group having 12 carbon atoms; produced by Kao Corporation; active ingredient 40% by weight; the numeral in TABLE 1 indicates an active ingredient amount

TABLE 1

|  |  |  | Examples | | | | | | | | | |
| --- | --- | --- | --- | --- | --- | --- | --- | --- | --- | --- | --- |
|  |  |  | 1 | 2 | 3 | 4 | 5 | 6 | 7 | 8 | 9 |
| Water-based ink composition (% by weight) | CAB-O-JET (trade name) 300 (*1) | Pigment P | 46.67 (7.0) | 46.67 (7.0) | 46.67 (7.0) | 46.67 (7.0) | 46.67 (7.0) | 46.67 (7.0) | 46.67 (7.0) | 46.67 (7.0) | 46.67 (7.0) |
|  | CAB-O-JET (trade name) 200 (*2) |  | — | — | — | — | — | — | — | — | — |
|  | CAB-O-JET (trade name) 260M (*3) |  | — | — | — | — | — | — | — | — | — |
|  | Glycerol |  | 33.0 | 24.0 | 22.0 | 15.0 | 6.0 | 24.0 | 36.0 | 4.0 | 32.0 |
|  | Triethylene glycol |  | — | — | — | — | — | — | — | — | — |
|  | 1,2-hexanediol |  | — | — | — | — | — | — | — | — | — |
|  | MACBIOBRIDE (trade name) MG-10P (*4) | Compound A | 4.00 | 8.00 | 10.00 | 15.00 | 20.00 | 10.00 | 3.00 | 22.00 | — |
|  | MACBIOBRIDE (trade name) MG-20P (*5) |  | — | — | — | — | — | — | — | — | 4.00 |
|  | MACBIOBRIDE (trade name) MG-10E (*6) |  | — | — | — | — | — | — | — | — | — |
|  | MACBIOBRIDE (trade name) MG-20E (*7) |  | — | — | — | — | — | — | — | — | — |
|  | SUCRAPH (trade name) AG-8 (*8) | Compound B | 1.50 | 4.00 | 4.00 | 5.00 | 8.00 | 2.40 | 1.00 | 8.00 | 1.50 |
|  | AG6206 (*9) |  | — | — | — | — | — | — | — | — | — |
|  | AG6202 (*10) |  | — | — | — | — | — | — | — | — | — |
|  | MYDOL (trade name) 10 (*11) |  | — | — | — | — | — | — | — | — | — |
|  | NONIOSIDE (trade name) B-15 (*12) |  | — | — | — | — | — | — | — | — | — |
|  | MYDOL (trade name) 12 (*13) |  | — | — | — | — | — | — | — | — | — |
|  | Water |  | balance | balance | balance | balance | balance | balance | balance | balance | balance |
| Compound A (% by weight)/Compound B (% by weight) | | | 2.7 | 2.0 | 2.5 | 3.0 | 2.5 | 4.2 | 3.0 | 2.8 | 2.7 |
| Compound A (% by weight)/Pigment P (% by weight) | | | 0.6 | 1.1 | 1.4 | 2.1 | 2.9 | 1.4 | 0.4 | 3.1 | 0.6 |
| Delay in ink charge | | | A | A | A | A | A | B | B | B | A |
| Vaporization property | | | A | A | A | A | A | B | B | B | A |

|  |  |  | Examples | | | | | | | | | |
| --- | --- | --- | --- | --- | --- | --- | --- | --- | --- | --- | --- |
|  |  |  | 10 | 11 | 12 | 13 | 14 | 15 | 16 | 17 | 18 |
| Water-based ink composition (% by weight) | CAB-O-JET (trade name) 300 (*1) | Pigment P | 46.67 (7.0) | 46.67 (7.0) | 46.67 (7.0) | 46.67 (7.0) | 46.67 (7.0) | 46.67 (7.0) | 46.67 (7.0) | 46.67 (7.0) | 46.67 (7.0) |
|  | CAB-O-JET (trade name) 200 (*2) |  | — | — | — | — | — | — | — | — | — |
|  | CAB-O-JET (trade name) 260M (*3) |  | — | — | — | — | — | — | — | — | — |
|  | Glycerol |  | 20.0 | 36.0 | 18.0 | 30.0 | 34.0 | 22.0 | 18.0 | 20.0 | 21.0 |
|  | Triethylene glycol |  | — | — | — | — | — | — | — | 2.0 | — |
|  | 1,2-hexanediol |  | — | — | — | — | — | — | — | — | 1.0 |
|  | MACBIOBRIDE (trade name) MG-10P (*4) | Compound A | — | 4.00 | — | 6.00 | — | 8.00 | — | 8.00 | 8.00 |
|  | MACBIOBRIDE (trade name) MG-20P (*5) |  | 10.00 | — | 15.00 | — | 4.00 | — | 10.00 | — | — |
|  | MACBIOBRIDE (trade name) MG-10E (*6) |  | — | — | — | — | — | — | — | — | — |
|  | MACBIOBRIDE (trade name) MG-20E (*7) |  | — | — | — | — | — | — | — | — | — |
|  | SUCRAPH (trade name) AG-8 (*8) | Compound B | 4.00 | — | — | — | — | — | — | 4.00 | 4.00 |
|  | AG6206 (*9) |  | — | 10.00 | 4.00 | — | — | — | — | — | — |
|  | AG6202 (*10) |  | — | — | — | 2.00 | 1.00 | — | — | — | — |
|  | MYDOL (trade name) 10 (*11) |  | — | — | — | — | — | 4.00 | 4.00 | — | — |
|  | NONIOSIDE (trade name) B-15 (*12) |  | — | — | — | — | — | — | — | — | — |
|  | MYDOL (trade name) 12 (*13) |  | — | — | — | — | — | — | — | — | — |
|  | Water |  | balance | balance | balance | balance | balance | balance | balance | balance | balance |
| Compound A (% by weight)/Compound B (% by weight) | | | 2.5 | 4.0 | 3.8 | 3.0 | 4.0 | 2.0 | 2.5 | 2.0 | 2.0 |
| Compound A (% by weight)/Pigment P (% by weight) | | | 1.4 | 0.6 | 2.1 | 0.9 | 0.6 | 1.1 | 1.4 | 1.1 | 1.1 |
| Delay in ink charge | | | A | A | A | A | A | A | A | A | A |
| Vaporization property | | | A | A | A | A | A | A | A | A | A |

|  |  |  | Examples | | Comparative Examples | | | | | | |
| --- | --- | --- | --- | --- | --- | --- | --- | --- | --- | --- |
|  |  |  | 19 | 20 | 1 | 2 | 3 | 4 | 5 | 6 | 7 |
| Water-based ink composition (% by weight) | CAB-O-JET (trade name) 300 (*1) | Pigment P | — | — | 46.67 (7.0) | 46.67 (7.0) | 46.67 (7.0) | 46.67 (7.0) | 46.67 (7.0) | 46.67 (7.0) | 46.67 (7.0) |
|  | CAB-O-JET (trade name) 200 (*2) |  | 35.00 (7.0) | — | — | — | — | — | — | — | — |
|  | CAB-O-JET (trade name) 260M (*3) |  | — | 50.00 (5.0) | — | — | — | — | — | — | — |

TABLE 1-continued

| | | | | | | | | | | |
|---|---|---|---|---|---|---|---|---|---|---|
| Glycerol | | 25.0 | 22.0 | 22.0 | 6.0 | 18.0 | 4.0 | 22.0 | 22.0 | 22.0 |
| Triethylene glycol | | — | — | — | — | — | — | — | — | — |
| 1,2-hexanediol | | — | — | — | — | — | — | — | — | — |
| MACBIOBRIDE (trade name) MG-10P (*4) | Compound A | 8.00 | 8.00 | — | — | — | — | — | — | — |
| MACBIOBRIDE (trade name) MG-20P (*5) | | — | — | — | — | — | — | — | — | — |
| MACBIOBRIDE (trade name) MG-10E (*6) | | — | — | 10.00 | 20.00 | — | — | 10.00 | 10.00 | 10.00 |
| MACBIOBRIDE (trade name) MG-20E (*7) | | — | — | — | — | 10.00 | 20.00 | — | — | — |
| SUCRAPH (trade name) AG-8 (*8) | Compound B | 4.00 | 4.00 | 4.00 | 8.00 | 4.00 | 8.00 | — | — | — |
| AG6206 (*9) | | — | — | — | — | — | — | 4.00 | — | — |
| AG6202 (*10) | | — | — | — | — | — | — | — | 4.00 | — |
| MYDOL (trade name) 10 (*11) | | — | — | — | — | — | — | — | — | 4.00 |
| NONIOSIDE (trade name) B-15 (*12) | | — | — | — | — | — | — | — | — | — |
| MYDOL (trade name) 12 (*13) | | — | — | — | — | — | — | — | — | — |
| Water | | balance | balance | balance | balance | balance | balance | balance | balance | balance |
| Compound A (% by weight)/Compound B (% by weight) | | 2.0 | 2.0 | 2.5 | 2.5 | 2.5 | 2.5 | 2.5 | 2.5 | 2.5 |
| Compound A (% by weight)/Pigment P (% by weight) | | 1.1 | 1.6 | 1.4 | 2.9 | 1.4 | 2.9 | 1.4 | 1.4 | 1.4 |
| Delay in ink charge | | A | A | C | C | C | C | C | C | C |
| Vaporization property | | A | A | C | C | C | C | C | C | C |

| | | | Comparative Examples | | | | | |
|---|---|---|---|---|---|---|---|---|
| | | | 8 | 9 | 10 | 11 | 12 | 13 |
| Water-based ink composition (% by weight) | CAB-O-JET (trade name) 300 (*1) | Pigment P | 46.67 (7.0) | 46.67 (7.0) | 46.67 (7.0) | 46.67 (7.0) | 46.67 (7.0) | 46.67 (7.0) |
| | CAB-O-JET (trade name) 200 (*2) | | — | — | — | — | — | — |
| | CAB-O-JET (trade name) 260M (*3) | | — | — | — | — | — | — |
| | Glycerol | | 22.0 | 20.0 | 33.0 | 31.0 | 37.0 | 37.0 |
| | Triethylene glycol | | — | — | — | — | — | — |
| | 1,2-hexanediol | | — | — | — | — | — | — |
| | MACBIOBRIDE (trade name) MG-10P (*4) | Compound A | 10.00 | 10.00 | 10.00 | — | — | — |
| | MACBIOBRIDE (trade name) MG-20P (*5) | | — | — | — | 10.00 | — | — |
| | MACBIOBRIDE (trade name) MG-10E (*6) | | — | — | — | — | — | — |
| | MACBIOBRIDE (trade name) MG-20E (*7) | | — | — | — | — | — | — |
| | SUCRAPH (trade name) AG-8 (*8) | Compound B | — | — | — | — | 4.00 | — |
| | AG6206 (*9) | | — | — | — | — | — | — |
| | AG6202 (*10) | | — | — | — | — | — | 4.00 |
| | MYDOL (trade name) 10 (*11) | | — | — | — | — | — | — |
| | NONIOSIDE (trade name) B-15 (*12) | | 4.00 | — | — | — | — | — |
| | MYDOL (trade name) 12 (*13) | | — | 4.00 | — | — | — | — |
| | Water | | balance | balance | balance | balance | balance | balance |
| | Compound A (% by weight)/Compound B (% by weight) | | 2.5 | 2.5 | — | — | — | — |
| | Compound A (% by weight)/Pigment P (% by weight) | | 1.4 | 1.4 | 1.4 | 1.4 | 0.0 | 0.0 |
| | Delay in ink charge | | C | C | C | C | C | C |
| | Vaporization property | | C | C | C | C | C | C |

As shown in TABLE 1, each of Examples 1 to 20 had good evaluation results of the delay in ink discharge and the vaporization property. Especially, regarding each of Examples 1 to 5 and 9 to 20 in which A/B≤4 (condition (I)) was satisfied and the blending amount of polyoxypropylene methyl glucoside in the entire amount of the water-based ink was in the range of 4% by weight to 20% by weight, the evaluation results of the delay in ink discharge and the vaporization property were very good. Further, all of Examples 1 to 20 satisfied A/P=0.4 to 3.2 (condition (Ill)). Regarding each of Examples 1 to 5 and 9 to 20 in which A/B≤4 (condition (I)) and A/P=0.5 to 2.9 (condition (IV)) were satisfied, the evaluation results of the delay in ink discharge and the vaporization property were very good.

Regarding each of Comparative Examples 1 to 7 in which polyoxyethylene methyl glucoside (the compound represented by the formula (3)) was used instead of polyoxypropylene methyl glucoside, each of Comparative Examples 8 and 9 in which a compound, which was represented by the formula (1) in which R was an alkyl group having 10 to 15 carbon atoms, was used instead of a compound which was represented by the formula (1) in which R was an alkyl group having 2 to 8 carbon atoms, each of Comparative Examples 10 and 11 in which no compound represented by the formula (1) was used, and each of Comparative Examples 12 and 13 in which no polyoxypropylene methyl glucoside was used, evaluation results of the delay in ink discharge and the vaporization property were bad.

As described above, the water-based ink of the present teaching prevents the increase in viscosity and the solidification due to drying which would otherwise cause the delay in ink discharge. The way of use of the water-based ink of the present teaching is not particularly limited, and the water-based ink is widely applicable to various types of ink-jet recording.

What is claimed is:
1. A water-based ink for ink-jet recording comprising:
a pigment;
water in an amount of 40% by weight to 90% by weight based on a total weight of the water-based ink;

polyoxypropylene methyl glucoside; and
a compound represented by the formula (1):

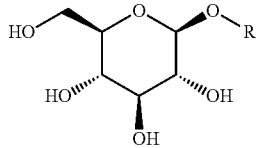 (1)

in the formula (1), R is a straight or branched chain alkyl group having 2 to 10 carbon atoms.

2. The water-based ink for ink-jet recording according to claim 1, wherein the water-based ink satisfies the following condition (I), $$A/B \leq 4 \qquad \text{condition (I):}$$

A: a blending amount of the polyoxypropylene methyl glucoside in the water-based ink (% by weight)
B: a blending amount of the compound represented by the formula (1) in the water-based ink (% by weight).

3. The water-based ink for ink-jet recording according to claim 1, wherein the water-based ink satisfies the following condition (II), $$2 \leq A/B \leq 4 \qquad \text{condition (II):}$$

A: a blending amount of the polyoxypropylene methyl glucoside in the water-based ink (% by weight)
B: a blending amount of the compound represented by the formula (1) in the water-based ink (% by weight).

4. The water-based ink for ink-jet recording according to claim 1, wherein a blending amount of the polyoxypropylene methyl glucoside in the water-based ink is in a range of 4% by weight to 20% by weight.

5. The water-based ink for ink-jet recording according to claim 1, wherein a blending amount of the polyoxypropylene methyl glucoside in the water-based ink is in a range of 6% by weight to 20% by weight.

6. The water-based ink for ink-jet recording according to claim 1, wherein the polyoxypropylene methyl glucoside is a compound represented by the formula (2):

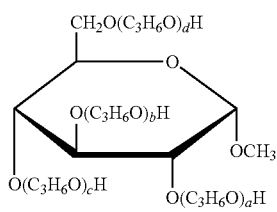 (2)

in the formula (2), a, b, c, and d are positive integers satisfying $10 \leq a+b+c+d \leq 20$.

7. The water-based ink for ink-jet recording according to claim 6, wherein the polyoxypropylene methyl glucoside is the compound represented by the formula (2), in the formula (2), a, b, c, and d are positive integers satisfying $a+b+c+d=10$ or $a+b+c+d=20$.

8. The water-based ink for ink-jet recording according to claim 1, wherein the pigment is a self-dispersible pigment.

9. The water-based ink for ink-jet recording according to claim 8, wherein the pigment is a self-dispersible pigment modified by carboxylic acid group or a self-dispersible pigment modified by sulfonic acid group.

10. The water-based ink for ink-jet recording according to claim 1, further comprising a glycerol, wherein a blending amount of the glycerol in the water-based ink is in a range of 6.0% by weight to 36% by weight.

11. The water-based ink for ink-jet recording according to claim 1, wherein a blending amount of the water in the water-based ink is in a range of 40% by weight to 61% by weight.

12. The water-based ink for ink-jet recording according to claim 1, wherein the water-based ink satisfies the following condition (III), $$A/P = 0.4 \text{ to } 3.2 \qquad \text{condition (III):}$$

A: a blending amount of the polyoxypropylene methyl glucoside in the water-based ink (% by weight)
P: a blending amount of the pigment in the water-based ink (% by weight).

13. The water-based ink for ink-jet recording according to claim 1, wherein the water-based ink satisfies the following conditions (I) and (IV), $$A/B \leq 4 \qquad \text{condition (I):}$$

$$A/P = 0.5 \text{ to } 2.9 \qquad \text{condition (IV):}$$

A: a blending amount of the polyoxypropylene methyl glucoside in the water-based ink (% by weight)
B: a blending amount of the compound represented by the formula (1) in the water-based ink (% by weight)
P: a blending amount of the pigment in the water-based ink (% by weight).

14. An ink cartridge which includes the water-based ink for ink-jet recording as defined in claim 1.

15. The water-based ink for ink-jet recording according to claim 1, wherein water is present in an amount of 40% by weight to 80% by weight based on a total weight of the water-based ink.

* * * * *